(12) United States Patent
Atkinson et al.

(10) Patent No.: US 6,192,121 B1
(45) Date of Patent: Feb. 20, 2001

(54) TELEPHONY SERVER APPLICATION PROGRAM INTERFACE API

(75) Inventors: Wesley Atkinson, Woodland Park; Richard McDuff; Craig Baxter, both of Colorado Springs, all of CO (US)

(73) Assignee: MCI Communications Corporation, Washington, DC (US)

(*) Notice: Under 35 U.S.C. 154(b), the term of this patent shall be extended for 0 days.

(21) Appl. No.: 08/934,166

(22) Filed: Sep. 19, 1997

(51) Int. Cl.[7] .............................. H04M 3/42; H04M 3/523
(52) U.S. Cl. ................................... 379/265; 379/201
(58) Field of Search .................................. 379/201, 207, 379/265, 266, 309

(56) References Cited

U.S. PATENT DOCUMENTS

| | | | |
|---|---|---|---|
| 3,643,034 | 2/1972 | Burns et al. | 179/27 D |
| 4,455,455 | 6/1984 | Little . | |
| 4,797,911 | 1/1989 | Szlam et al. | 379/67 |
| 4,829,563 | 5/1989 | Crockett et al. | 379/309 |
| 4,837,799 | 6/1989 | Prohs et al. | 379/224 |
| 4,881,261 | 11/1989 | Oliphant et al. | 379/215 |
| 4,894,857 | 1/1990 | Szlam et al. | 379/67 |
| 4,896,345 | 1/1990 | Thorne | 379/67 |
| 5,099,510 | 3/1992 | Blinken, Jr. et al. . | |
| 5,101,425 | 3/1992 | Darland et al. | 379/34 |
| 5,155,763 | 10/1992 | Bigus et al. | 379/113 |
| 5,214,688 | 5/1993 | Szlam et al. | 379/67 |
| 5,247,569 | 9/1993 | Cave | 379/113 |
| 5,309,505 | 5/1994 | Szlam et al. | 379/88 |
| 5,467,391 | 11/1995 | Donaghue, Jr. et al. | 379/265 |
| 5,491,797 | 2/1996 | Thompson et al. . | |
| 5,546,449 | 8/1996 | Hogan et al. . | |
| 5,915,012 | * 6/1999 | Miloslavsky | 379/265 X |
| 5,946,375 | * 8/1999 | Pattison et al. | 379/265 X |

FOREIGN PATENT DOCUMENTS

| | | |
|---|---|---|
| 2041882 | 5/1991 | (CA) . |
| 0 340 665 A2 | 11/1989 | (EP) .............................. H04M/3/36 |
| WO 96 36157 | 11/1996 | (WO) . |

* cited by examiner

*Primary Examiner*—Harry S. Hong

(57) ABSTRACT

An application program interface (API) provides an interface for application programs to communicate with a telephony server. The telephony server generates events regarding calling activity within a call center. The API receives these events and forwards them to the application programs. The API may be run on an agent workstation along with application programs. The applications register with the API to identify what types of events are of interest to the application program. The API receives the events from the telephony server and distributes the events according to the registrations.

26 Claims, 10 Drawing Sheets

Event Types for CTI Server
126

| | |
|---|---|
| EventAgentLogin | 128 |
| EventAgentLogout | 130 |
| EventAgentReady | 132 |
| EventAgentNotReady | 134 |
| EventAgentBusy | 136 |
| EventAgentNotBusy | 138 |
| EventCallAbandonedQueue | 140 |
| EventCallEnteredQueue | 142 |
| EventCallForwardCancel | 144 |
| EventCallForwardSet | 146 |
| EventCallHolded | 148 |
| EventCallUnHolded | 150 |
| EventConferenced | 152 |
| EventDestinationBusy | 154 |
| EventDialing | 156 |

Event Types for CTI Server
126

| | |
|---|---|
| EventError | 160 |
| EventEstablished | 162 |
| EventOffHook | 164 |
| EventOnHook | 166 |
| EventReleased | 168 |
| EventRetrieved | 170 |
| EventRinging | 172 |
| EventRouted | 174 |
| EventRouteRequest | 176 |
| EventServerDisconnected | 178 |
| EventTransferred | 180 |

FIG. 10

TELEPHONY SERVER APPLICATION PROGRAM INTERFACE API

TECHNICAL FIELD

The present invention relates generally to telecommunications systems, and more particularly, to a telephony server application program interface (API).

BACKGROUND OF THE INVENTION

A typical call center includes a number of agents who handle inbound telephone calls and place outbound telephone calls on behalf of business clients. Each agent may receive or place calls for multiple business clients. Each agent has an associated station that includes a personal computer or workstation, a phone pad, and a headset. The agents are organized into groups that have associated supervisors who are responsible for managing and overseeing the agents in the respective groups. Each agent workstation typically runs multiple software application programs. These application programs may include an application program for controlling a telephone pad and call service application programs that assist the agent in handling calls for different business clients.

Certain conventional call centers include a computer/telephone interface (CTI) server that produces events regarding calling activity. The CTI server is typically connected to an automatic call distributor (ACD) that is responsible for distributing calls within the call center. The CTI server extracts call data from the ACD and encapsulates the extracted data in events that are output to clients. Typically, in order for an application running on an agent workstation to receive events from the CTI server, the application must register with the CTI server, and provide code for communicating directly with the CTI server. As a result, the complexity and cost of creating such application programs is increased substantially.

SUMMARY OF THE INVENTION

The present invention relieves application programs of the burden of having to directly interface with a CTI server. The present invention provides an application program interface (API) that acts as an intermediary between the CTI server and application programs. The API may register with the CTI server to receive all events that concerns calls destined to a particular agent. Application programs register with the API to receive events that are of interest to the application programs. The API then sends the events for which the application programs are registered onto the application programs. As a result, the application programs need not be concerned with interfacing with the CTI server.

In accordance with a first aspect of the present invention, a method is practiced on a selected computer system of a given agent station within a call center. The call center has multiple agents stationed at agent stations. The call center also includes a telephony server for generating events regarding calling activity within the call center. An application program interface (API) is provided that interfaces with the telephony server. At least one application program runs on the selected computer system. An event is received at the API from the telephony server, and the event is passed to the application program from the API.

In accordance with another aspect of the present invention, a first and second application program are provided in a selected computer system that is part of an agent station within a call center. An API is provided that interfaces with the telephony server to receive events. The telephony server generates events regarding calling activity within the call center. A first event is received from the telephony server at the API and passed to the first application program. A second event is received from the telephony server at the API and passed to the second application program.

In accordance with a further aspect of the present invention, a call center includes a telephony server for generating events regarding calling activity in the call center. The call center also includes an agent station for an agent to handle calls. The agent station has a telephone pad and a computer system. The computer system includes an application program and an API for interfacing with the telephony server to receive events from the telephony server and to pass the events to the application program.

In accordance with an additional aspect of the present invention, a computer system is located within a call center that has a telephony server for generating events regarding calling activity in the call center. The computer system includes a processor for running at least one application program and an API that receives events from the telephony server. The API forwards at least one of the events to the application program. The computer system additionally includes a storage for storing the application program and the API.

BRIEF DESCRIPTION OF THE DRAWINGS

A preferred embodiment of the present invention will be described below relative to the following drawings.

FIG. 10 is a block diagram illustrating the event architecture that is used by the preferred embodiment of the present invention.

DETAILED DESCRIPTION OF THE INVENTION

The preferred embodiment of the present invention provides an answering service that acts as an intermediary between a telephony server and application programs. The answering service is implemented as an application program interface (API) having functions that application programs may call to receive events from the telephony server. These events contain information regarding calling activity within a call center. The answering service is designed to be part of an agent workstation that is used by an agent within a call center. The answering service relieves application programs of the burden of having to directly communicate with a telephony server.

As will be described in more detail below, each instance of the answering service is run on a particular agent workstation. Each instance of the answering service registers with the telephony server to receive all events regarding calls that are destined to the telephone pad of the associated agent. Application programs, in turn, register with the answering service to receive selected events that are of concern to the application programs. Thus, different events may be forwarded by the answering service to different application programs. Nevertheless, certain events may be passed to multiple application programs.

Figure 1:
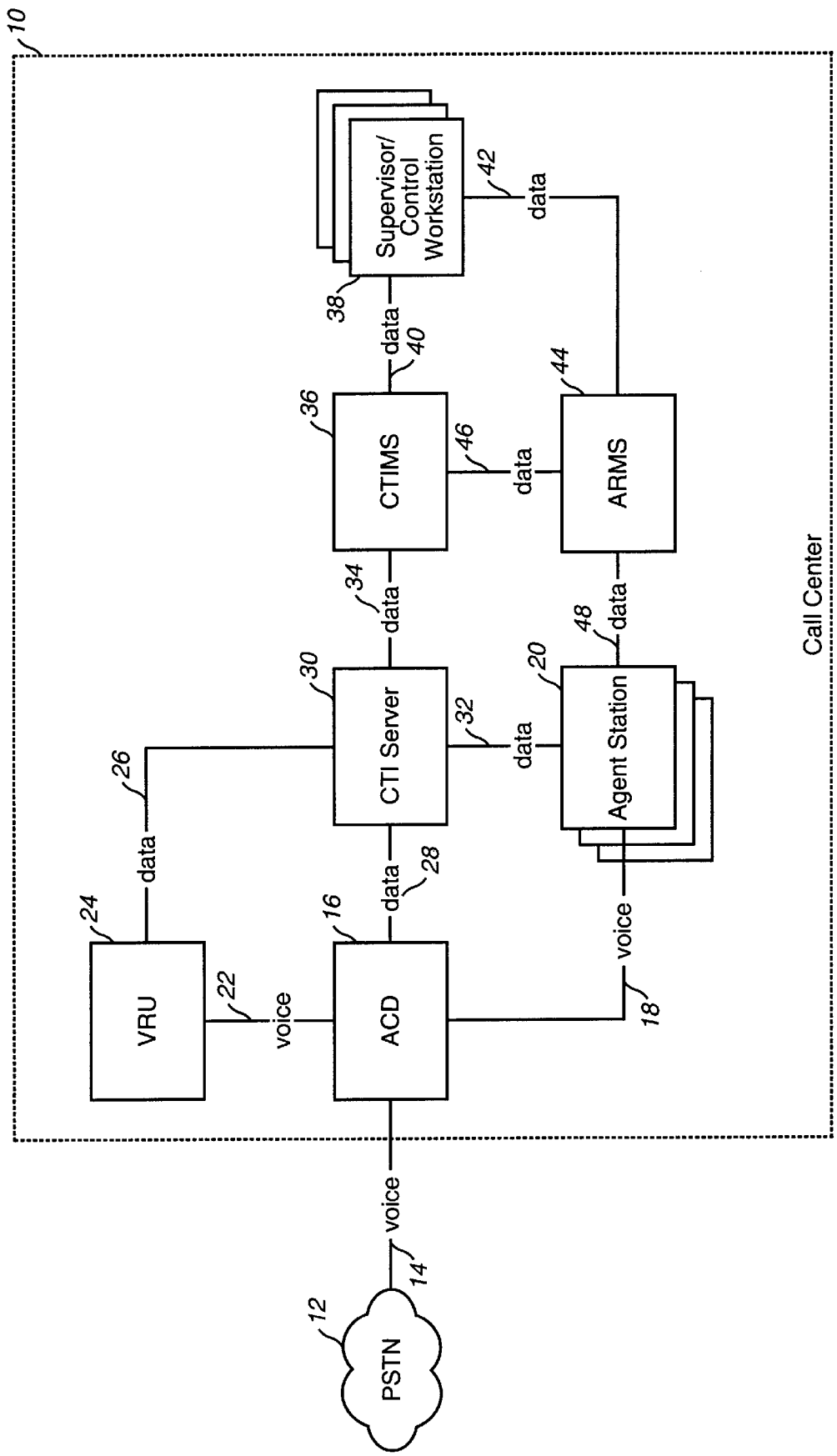
FIG. 1 is a block diagram of a portion of a telecommunications system that is suitable for practicing the preferred embodiment of the present invention.

FIG. 1 is a block diagram that illustrates a portion of a telecommunications system network that is suitable for practicing the preferred embodiment of the present invention. The telecommunications network includes a call center 10 that is connected to a public switched telephone network (PSTN) 12 via a voice trunk 14. One skilled in the art will appreciate that the call center may alternatively be connected to other types of networks from which calls may originate. The call center 10 includes an automatic call distributor (ACD) 16 or other switching mechanism for distributing incoming calls within the call center. The ACD 16 is connected via voice trunk 18 to agent stations 20. These agent stations include a workstation, a personal computer, phone pad, and a headset, as will be described in more detail below. Agents are stationed at the agent stations 20 and utilize the resources contained therein to process calls. The ACD 16 is also connected via voice trunk 22 to a voice response unit (VRU) 24. The VRU 24 automates call processing. The VRU 24 may be used to collect information such as account numbers, credit card numbers, and service requests from callers. The VRU 24 is connected to a computer/telephone integration (CTI) server 30 via data link 26. The CTI server 30 extracts call data from the ACD 16 and produces useful statistical data from this raw call data. The CTI server 30 also distributes data in the form of events. The CTI server 30 may run as a separate processor on a dedicated computer or may run on a shared computer system. A suitable CTI server is the T Server produced by Genesys Labs of San Bruno, Calif. The CTI server 30 is connected to the ACD 16 via data link 28 and is also connected to the agent stations 20 via data link 32.

CTI monitoring server (CTIMS) 36 is connected to the CTI server 30 via data link 34. CTIMS 36 may be implemented on a dedicated computer or a shared computer that also runs the CTI server process. CTIMS 36 compiles the statistical data that is collected from the CTI server 30 into useful data for presentation and management at the supervisor/control workstation 38. The compiled data is utilized by the client application program that produces a graphical user interface (GUI) for supervisors. CTIMS 36 registers with the CTI server 30 to receive all events that are output by the CTI server 30. CTIMS 36 categorize events into groups, such as by agent, by agent group, by call center, by business type, and the like.

CTIMS 36 is connected to an automated resource management system (ARMS) 44 via data link 46. ARMS 44 provides management of resource data for the call center. ARMS contains a database and a database management system (DBMS) for managing the call center resource data.

ARMS is accessed by CTIMS 36 and supervisor/control workstation 38.

Those skilled in the art will appreciate that the call center may have a different configuration other than that depicted in FIG. 1. Moreover, those skilled in the art will appreciate that the present invention need not be practiced in a call center environment but may also be practiced in other environments where telephone agents are utilized.

Initially, a call originates from the PSTN 12 and is sent over the voice trunk 14 to the ACD 16. The ACD 16 decides where the call should be sent. The call will first be routed over a voice trunk 22 to the VRU 24. The VRU 24 includes voice messages for obtaining information from the caller, such as account numbers, credit card numbers, and service requests. The information gathered by the VRU is passed over data link 26 to the CTI server 30. The CTI server 30, in turn, passes the data to the agent workstation that will be servicing the call. The ACD 16 then switches the call to the agent station 20 that is to handle the call. An application may be run on the agent workstation to provide a screen pop of the information that was collected by the VRU so that the agent at the agent station has this information available. The agent then accepts a call and processes it accordingly.

Figure 2:
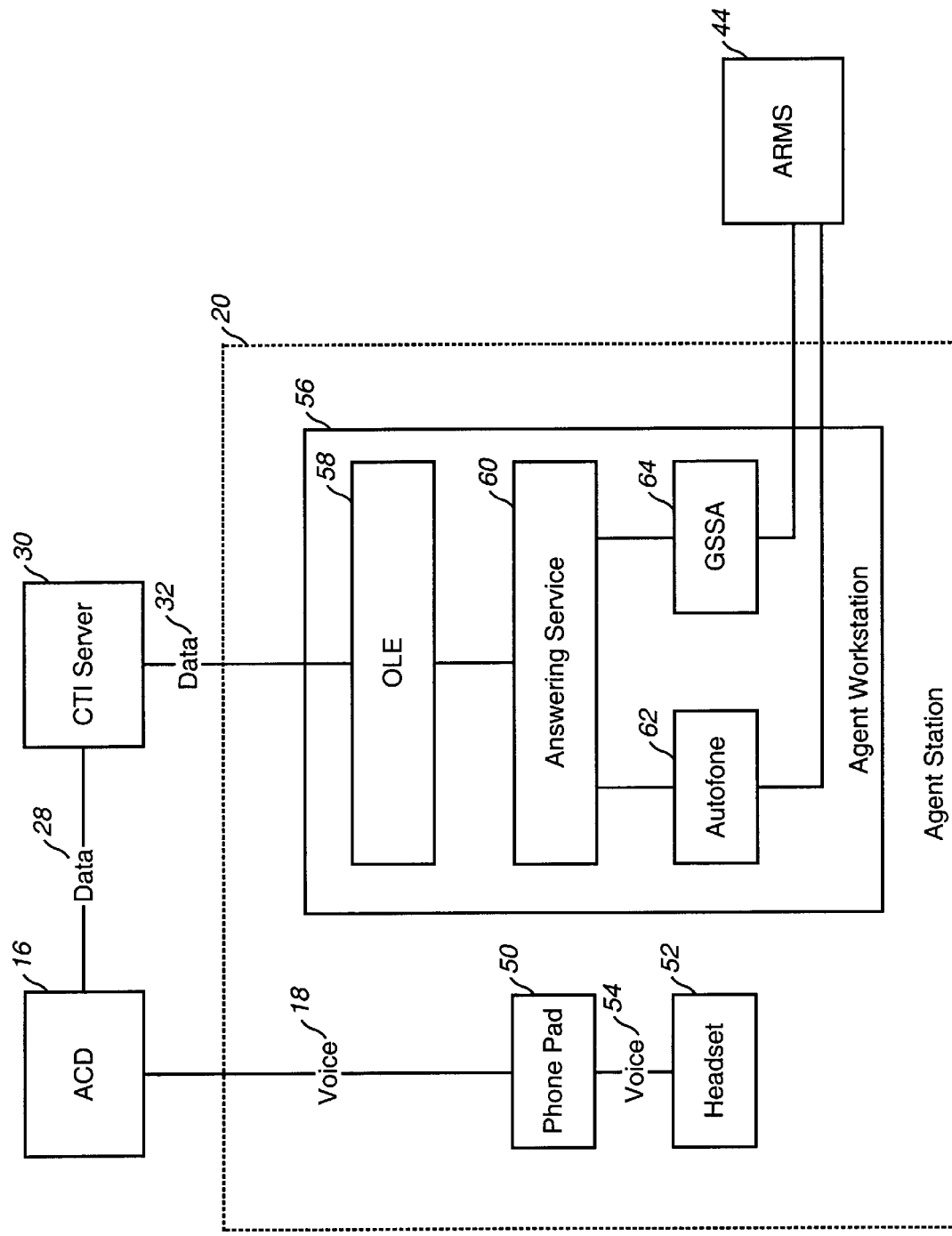
FIG. 2 is a block diagram of an agent station that is suitable for practicing the preferred embodiment of the present invention.

FIG. 2 depicts a logical view of an agent station 20 that is suitable for practicing the preferred embodiment of the present invention. The agent station 20 includes a phone pad 50 that may be used to place outbound calls. The phone pad 50 is connected via voice trunk 54 to a headset 52 that the agent may use to listen and speak on telephone calls. The agent station 20 also includes an agent workstation 56 which may be implemented as a personal computer system, a workstation, or other suitable computer system (see FIG. 3). The agent workstations include support for the Microsoft® OLE protocol 58 from Microsoft Corporation of Redmond, Wash. The agent station 20 includes an answering service that serves as a single common API for desktop applications to interface with the CTI server 30 and the ACD 16. Agent workstation 56 also includes a desktop application program referred to as "autofone" 62 that controls a telephone pad. Autofone produces a user interface that resembles the face of a telephone that contains functional buttons to allow a user to login, logout, accept calls, place calls, log breaks, updates status information, and access phone books. A suitable implementation for autofone 62 is described in more detail in co-pending application, entitled "Desktop Telephony Application Program for Call Center Agent," which was filed on even date herewith, which is assigned to a common assignee with the present application and which is explicitly incorporated by reference herein.

The agent workstation 56 includes a generic sales and service application (GSSA) 64. GSSA 64 is a configurable application platform that performs customer sales and service processing for different business clients. GSSA 64 is used by agents to service customer calls. A suitable implementation of GSSA is described in more detail in co-pending application, entitled "CONFIGURABLE APPLICATION PROGRAM FOR CALL CENTER SALES AND SERVICES," which was filed on even date herewith, which is assigned to a common assignee with the present application and which is explicitly incorporated by reference herein.

Those skilled in the art will appreciate the agent station configuration depicted in FIG. 2 is intended to be merely illustrative. The present invention may also be practiced with a different configuration. Components are shown merely as illustrative components of the preferred embodiment of the present invention.

Figure 3:
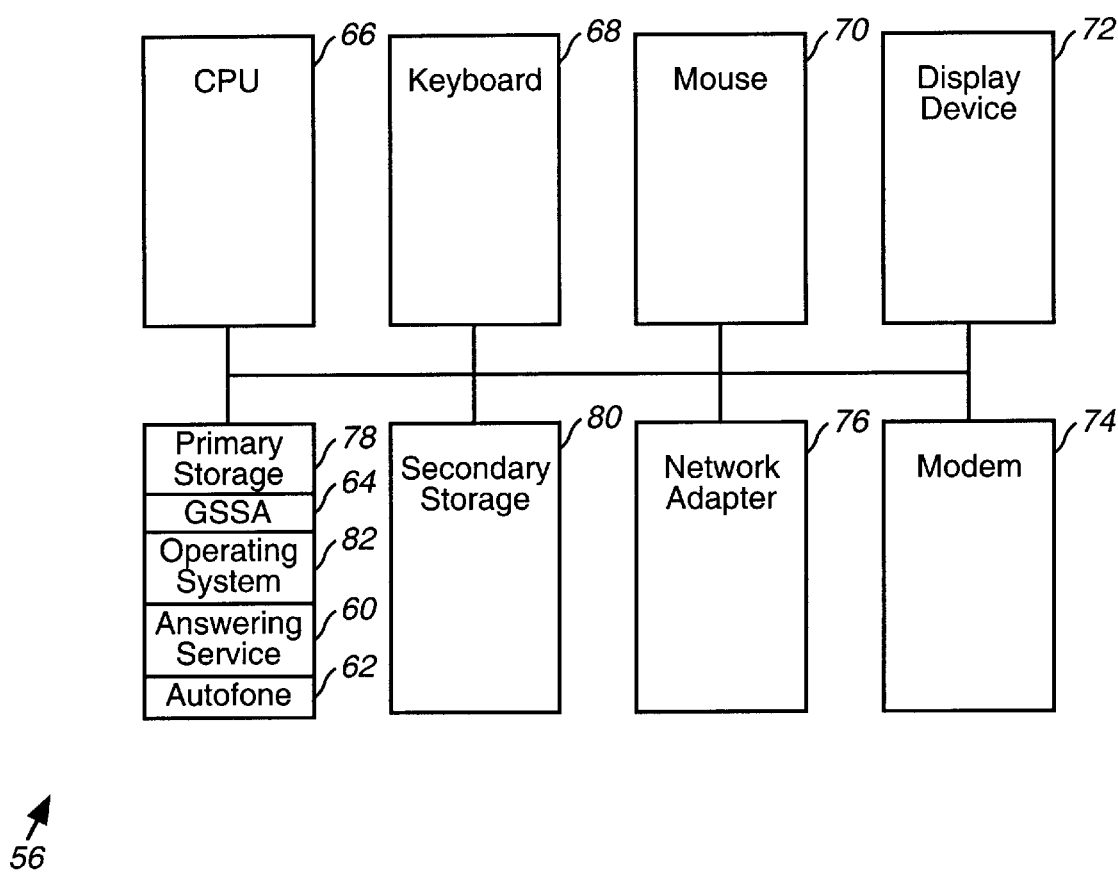
FIG. 3 is a block diagram illustrating the components of the agent workstation in more detail.

FIG. 3 shows a block diagram of the architecture of agent workstation 56 in more detail. The agent workstation 56 includes a central processing unit (CPU) for managing and overseeing operation of the workstation. The agent workstation 56 may also include a number of peripheral devices, including a keyboard 68, a mouse 70, and a display device 72, such as a video display device. The agent workstation 56 may have a modem 74 for interfacing with telephone lines and a network adapter 76 for interfacing with a network. The agent workstation 56 includes primary storage 78 and secondary storage 80. The primary storage 78 includes an operating system 82, such as the Microsoft® Windows® 95 Operating System or the Microsoft® Windows® NT Operating System. The operating system 82 provides support for the Microsoft® OLE protocol 58 (see FIG. 2). The secondary storage 80 may hold a number of types of data program.

Figure 4:
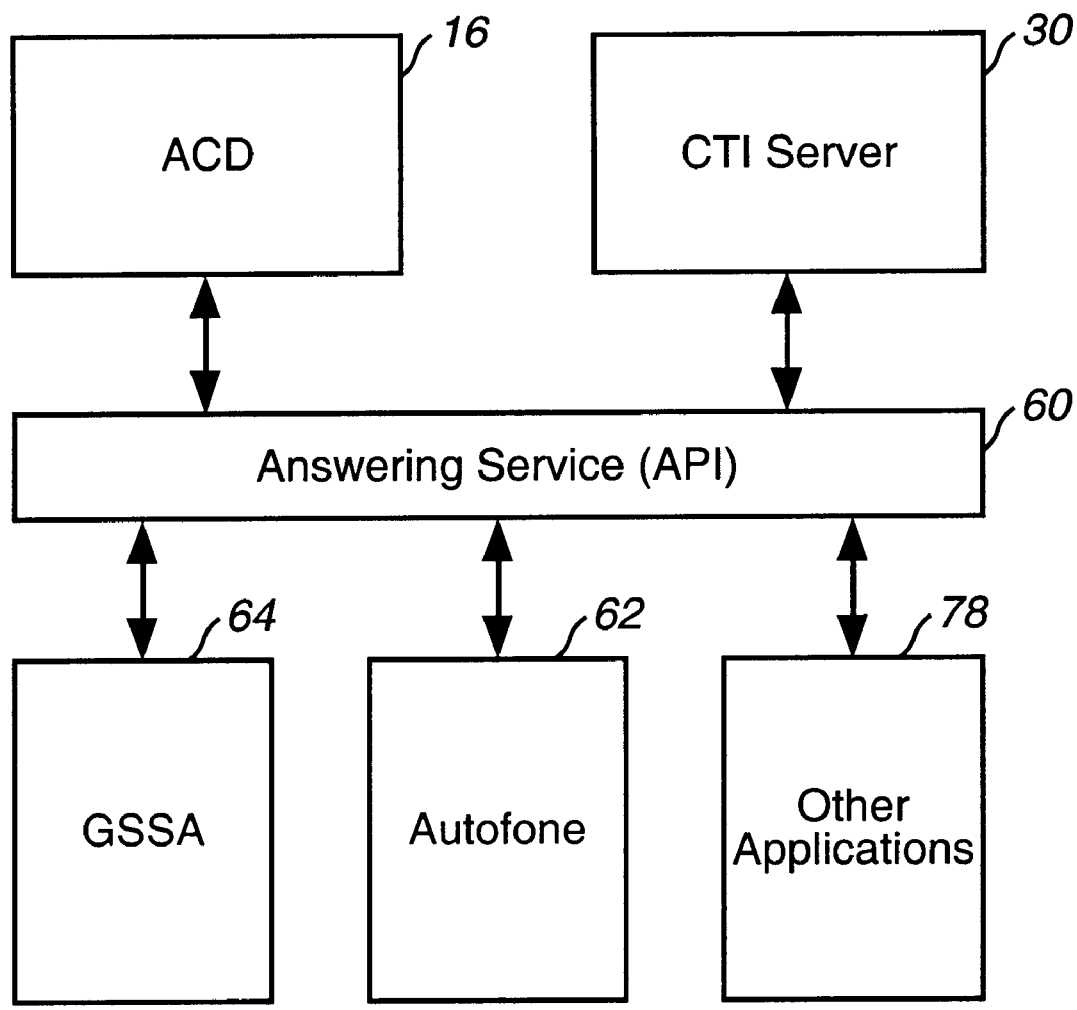
FIG. 4 is a block diagram illustrating data flow between application programs, the answering service, the ACD, and the CTI server.

As was mentioned above, the preferred embodiment of the present invention provides an answering service that is implemented as an API to interface application programs with a telephony server 30 and an ACD 16. FIG. 4 is a block diagram that illustrates the data flow between the application programs, the ACD 16, and the CTI server 30. The answering service 60 serves as an intermediary through which applications such as GSSA 64 and autofone 62 may receive events from the CTI server 30. Other application program 78 may also receive events from the answering service 60.

Figure 5:
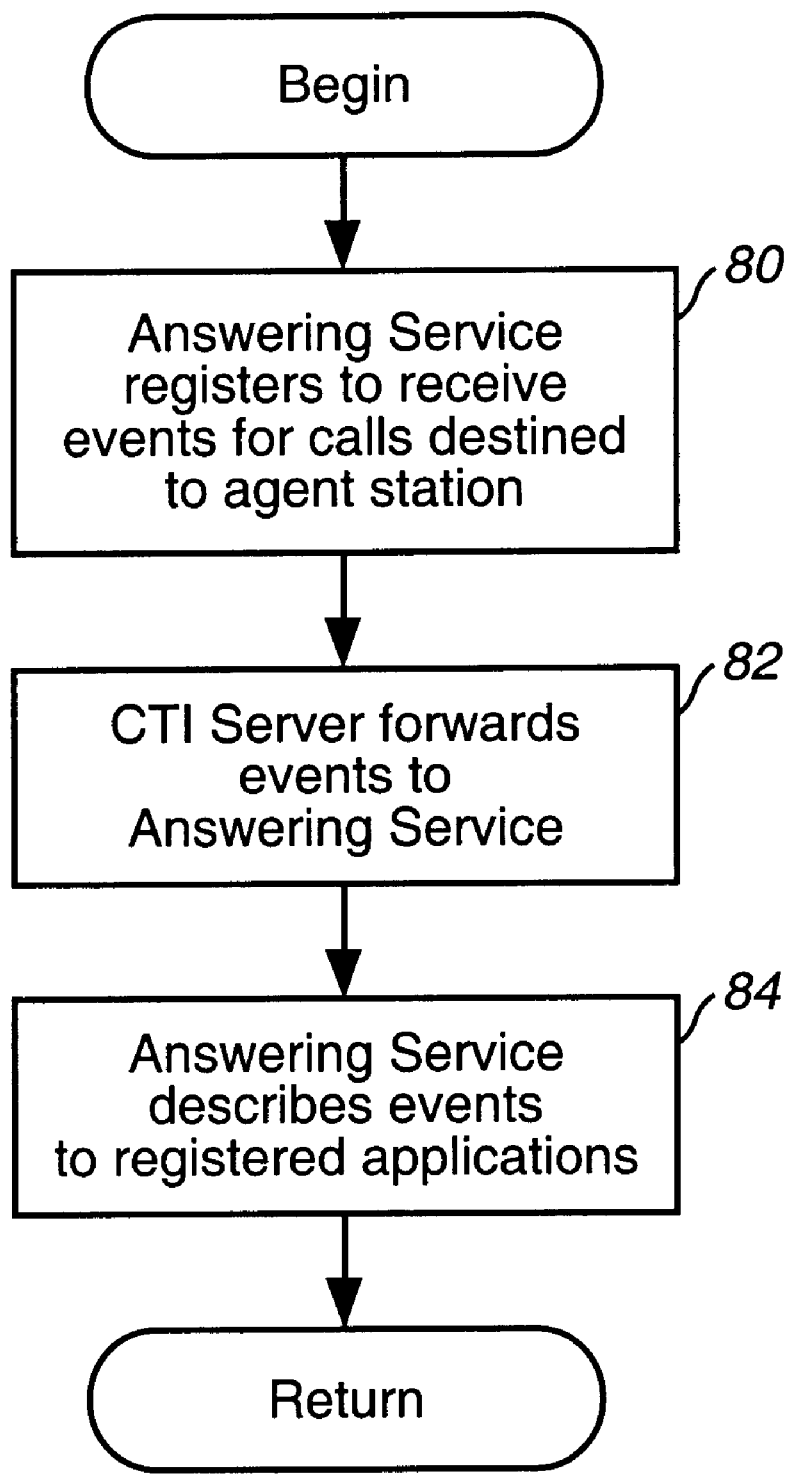
FIG. 5 is a flow chart providing an overview of the steps that are performed in the preferred embodiment of the present invention.

FIG. 5 is a flow chart illustrating the steps that are performed for application programs to receive events from the CTI server 30. Initially, the answering service 60 registers with the CTI server 30 to receive events for calls that are destined to the agent station on which the answering service is running (step 80 in FIG. 5). The CTI server 30 provides a mechanism by which a client may register to receive events. As will be described in more detail below, the answering service provides a dispatch function for dispatching events encapsulated in event structures from the CTI server 30. After registration is completed, the CTI server 30 forwards events to the answering service 60 (step 82 in FIG. 5). The answering service then distributes the events to registered application programs (step 84 in FIG. 5).

Figure 6:
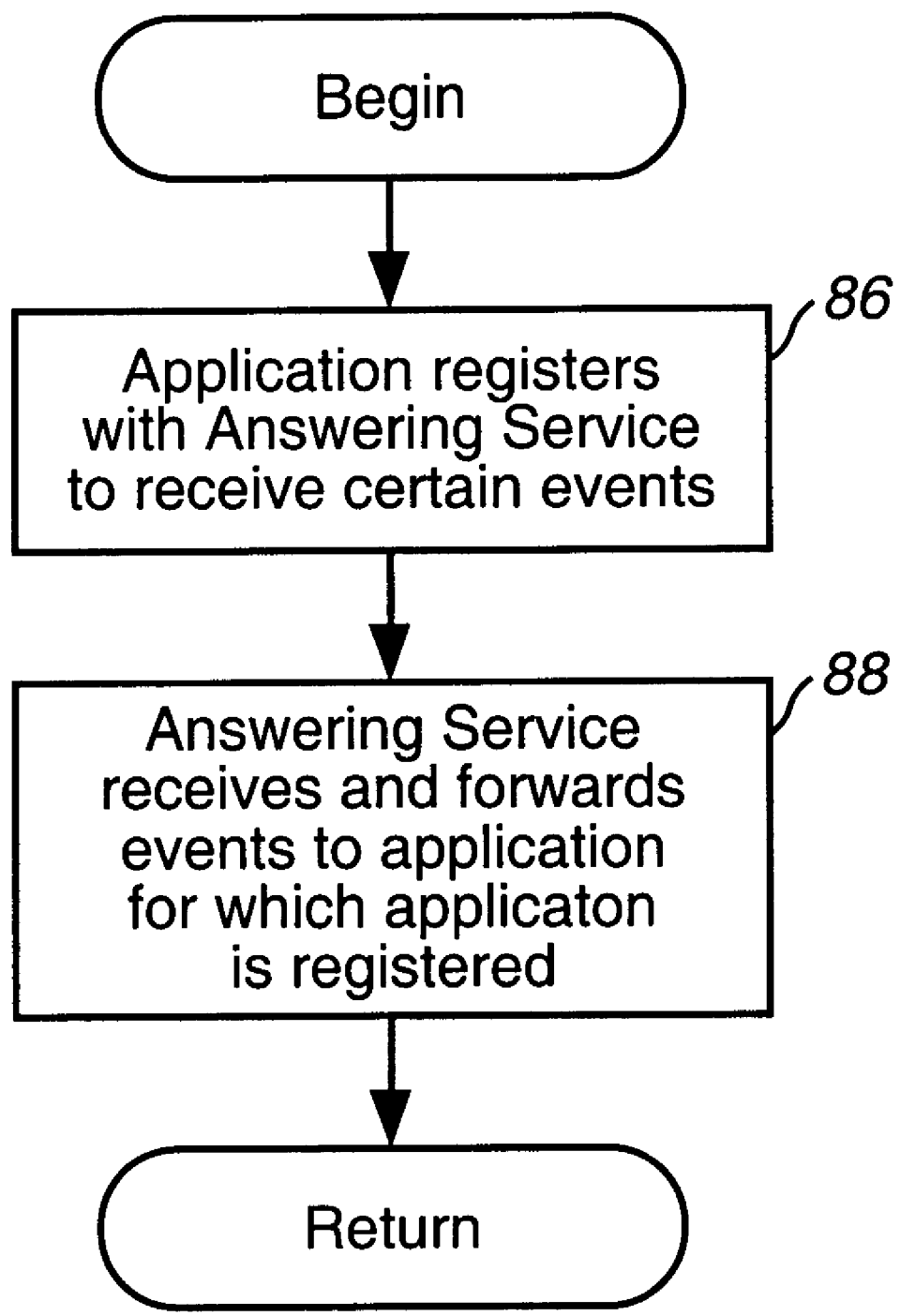
FIG. 6 is a flow chart illustrating the steps that are performed for an application program to receive events from the API.

As shown in FIG. 6, each application program must register with the answering service 60 to receive events that have originated from the CTI server 30. An application program registers with the answering service to receive certain events (step 86 in FIG. 6) and subsequently, when an event of the type for which an application registered arrives at the answering service, the answering service forwards the event to the application program (step 88 in FIG. 6). The registration process enables the distribution of events to application programs by the answering service to be configurable. Different application programs may register to receive different types of events. The answering service 60 provides a separate event holder object for each type of event. The answering service 60 provides a new event holder function which may be called by an application program to register to receive events. The answering service 60 maintains a list of event holder objects. The client application program requests access to an event holder object by calling the new event holder function that is provided by the answering service 60. The answering service 60 tags the event holder object for use by the requesting client application program. The requesting client application program specifies what type of events are of interest to it. Subsequently, as events arrive at the answering service 60, they are placed into the respective event holder objects. The client application programs periodically poll the event holder objects to be informed of any new events. The client application programs may then extract the events from the event holder objects.

Figure 7:
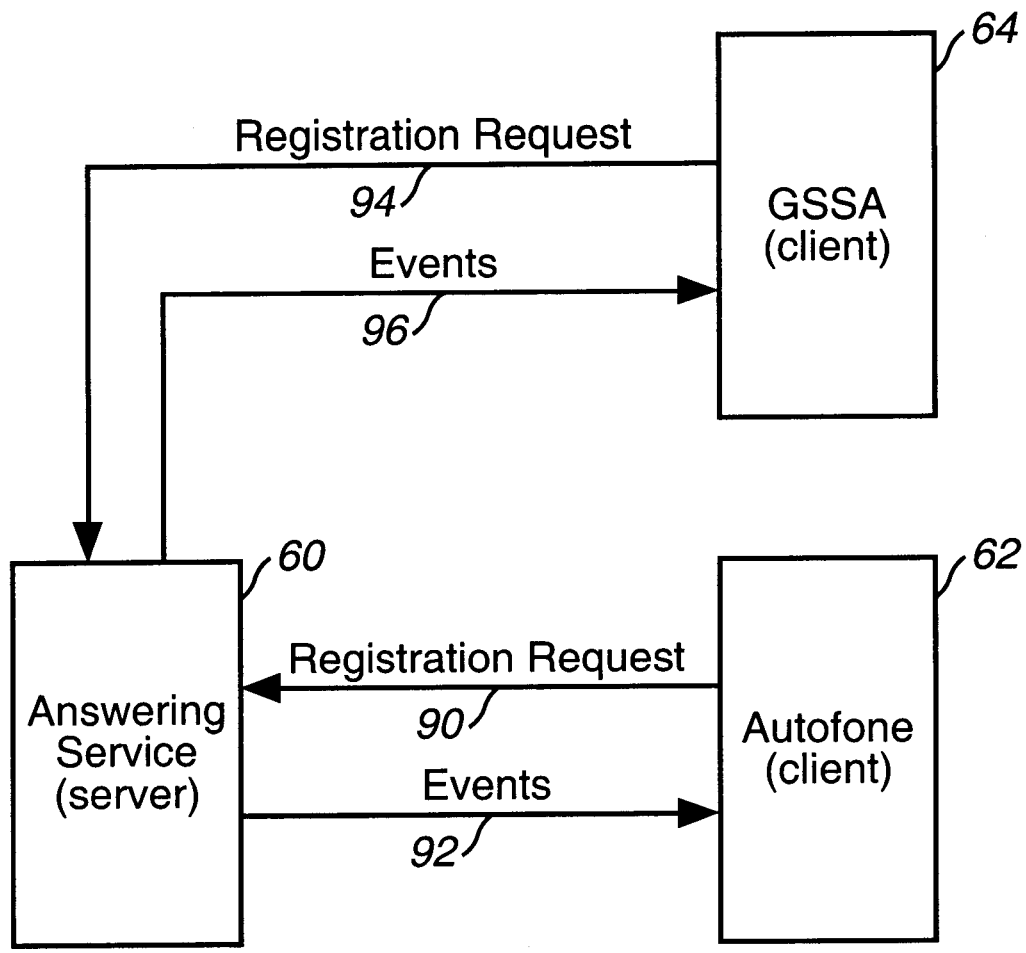
FIG. 7 is a block diagram illustrating data flow between the answering service and application programs.

FIG. 7 is a block diagram that illustrates the registration process. In the example depicted in FIG. 7, autofone 62 and GSSA 64 both register to receive events from the answering service 60. In this regard, the answering service 60 accesses a server and both autofone 62 and GSSA 64 act as clients. Autofone submits a registration request 90 and receives back events 92 after registration is completed. GSSA 64 submits registration requests 94 and receives back events 96. As was mentioned above, these two applications may register to receive different events. In particular, autofone 62 calls a NotifyOnCallsForLWN( ) function of the answering service 60 to register autofone to receive notifications of any calls routed to the phone pad of the agent station. GSSA 64, in contrast, registers to receive events for calls to certain dialed number identification service (DNIS) numbers. In particular, GSSA 64 registers to receive numbers for which a sales/service application had been built. Each DNIS is associated with a particular business client of the call center.

Figure 8:
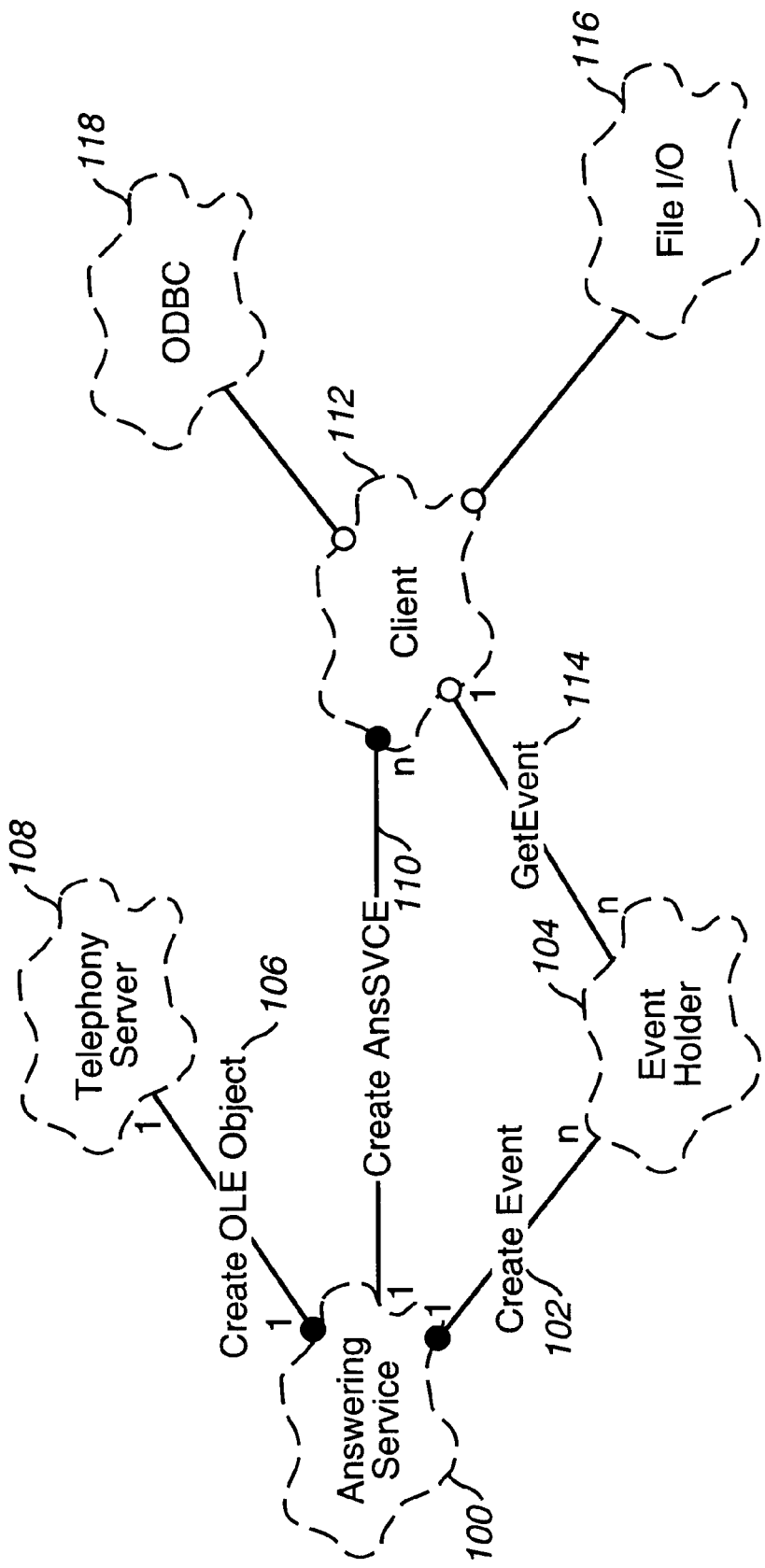
FIG. 8 is a diagram that illustrates the object architecture of the answering service.

FIG. 8 depicts the object architecture that is used in the preferred embodiment of the present invention. The answering service 100 is implemented as an object that supports various functions. The new event holder function is part of the answering service API and may be used to create an event object holder 104 on behalf of a client application program 112. The event holder object 104 may support a GetEvent( ) function 114 that enables the client to obtain an event that is stored within the event holder 104. The client object 112 may interface with a file I/O object for performing input/output of files and an ODBC object 118. The answering service restores an event on the event holder 104 by calling a CreateEvent function. The answering service is instantiated by the CreateAnsSVCE( ) function 110, which is called the first time the client requests use of the answering service 100.

The answering service 100 interfaces with the telephone server 108 by creating an OLE object that is provided via the Microsoft® OLE protocol 58. The Microsoft® OLE protocol 58 provides an event system infrastructure that is leveraged by the answering service 60. The Microsoft® OLE protocol provides a standard way for objects to fire events and also provides a connection architecture for connecting events sources with event sinks. The event and connection architectures are in large part achieved by defining "interfaces." In the Microsoft® OLE protocol, an "interface" is a name set of logically related functions. Each interface lists signatures for a set of functions, but does not provide code for implementing the set of functions; rather, objects provide the code for implementing the functions. Such object is said to "support" the interface for which they provide code.

The event architecture enables an event source to source events that are sinked by an event sink. As will be described in more detail below, an event source triggers events on an event sink by calling methods on the event sink. Events are logically grouped into semantically-related event sets, and interfaces are defined for each event set that an event sink wishes to sink. Interfaces are provided to provide a form of registration so that an event may register to sink events that are sourced by an event source. The registration occurs on a per-event set basis.

Figure 9:
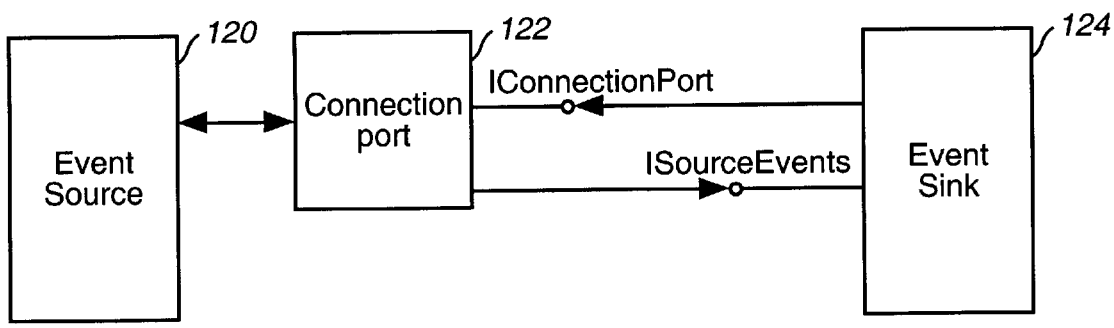
FIG. 9 is a diagram that illustrates the different event types that are provided by the CTI server.

The event source 120 (FIG. 9) exposes connection points 122 to which an event sink may connect. Each connection point is associated with a particular event set and indicates that the event source is ready to source events for the associated event set. A connection point may be connected by multiple connections to multiple event sinks, and an event source may have multiple connection points.

Each event set has an associated instance of an interface that the event sink supports. For the example shown in FIG. 9, the event sink 124 supports a set of events in the ISomeEvents interface. The ISomeEvents interface includes a number of methods that may be called from a connection point to trigger associated events. Events are triggered by calling the associated method in the event set interface is that the event sink 10 supports. The connection point 122 supports an interface, IConnectionPoint, that provides methods for the connection point.

In the preferred embodiment of the present invention, the event source 120 is the telephony server 108. The telephony server creates a connection point for an instance of the answering service, which acts as an event sink 100. This connection point is associated with an event set containing all events concerning calls that are sent to the agent station on which the answering service is run. The telephony server 108 may pass events to the answering service by calling methods of the interface associated with the event set supported by the answering service.

The CTI server 30 provides a number of different types of events to the answering service 60. FIG. 10 lists different events types 126 that are provided by the CTI server 30. The EventAgentLogin event type 128 reports that an agent has just logged onto an agent station 20. Conversely, the EventAgentLogout event type 130 indicates that an agent has logged out. The EventAgentReady event type 132 indicates that an agent has made the agent station ready for operation. The EventAgentNotReady event type 134 indicates that the agent is not ready for operation. The EventAgentBusy event type 136 indicates that the telephone set of the agent is busy and the EventAgentNotBusy event type 138 indicates that the agent's telephone set is not currently busy.

The EventCallAbandonedQueue event type 140 indicates that there was no available agent to handle a call that was in the queue and, as a result, the caller opted to disconnect the call rather than waiting in the queue. The EventCallEnteredQueue event type 142 indicates that a call has entered the queue but has not yet been reached by an agent. The EventCallForwardCancel event type 144 indicates that call forwarding for a given phone number has been canceled. The EventCallForwardSet event type 146 indicates that calls to a particular telephone set are being forwarded. The EventCallHolded event type 148 indicates that a call has been placed on hold. The EventCallUnholded event type 150 indicates that a call has been retrieved from the hold state.

The EventConferenced event type 152 indicates that a call has been conferenced in with other calls at other locations. The EventDestinationBusy event type 154 indicates that the destination of a call is currently busy. The EventDialing event type 156 indicates that a call is being dialed. The EventError event type 160 indicates that an error has occurred. This event type is used in calculating error status information and agent state information. The EventEstablished event type 162 indicates that a call has been connected successfully. This message type may indicate that a call has successfully reached an agent.

The EventOffHook event type 164 indicates that a telephone receiver is off the hook. The EventOnHook event type 166 indicates that a telephone receiver is on hook. The EventReleased event type 168 indicates that a call has been disconnected. This event type may indicate the end of a call with an agent. The EventRetrieved event type 170 indicates that a call has been transferred or a conference has been retrieved. The EventRinging event type 172 indicates the arrival of a call on the ACD. The EventRouted event type indicates that a call has reached an agent that was previously waiting to be routed but that has now been routed. The EventRouteRequest event type 176 indicates a call was made using a special number, has reached an agent and is waiting to be routed. The EventServerDisconnected event type 178 indicates that a connection to a local server has been lost and the EventTransferred event type 180 indicates that a call is being transferred to another location.

The events also include additional information. This additional information includes an agent ID that specifies the ACD ID for the call. This ACD ID refers to a telephone pad ID, which in turn may be associated with an agent. The event structure may also include an ANI attribute that holds a pointer to Automatic Number Identification Service digits for the current call. Information regarding call type (such as inbound call, outbound call, internal call, or unknown call) may be provided within the event structure. A DNIS attribute may be included in the event structure that includes a pointer to an ASCII representation of the Dialed Number Identification Service digits for the current call. These DNIS values are associated with business clients so that CTIMS 36 knows the business client for which the call is being handled. The event structure may also hold error code information and error message information.

While the present invention has been described with reference to a preferred embodiment thereof, those skilled in the art will appreciate that various changes in form and detail may be made without departing from the intended scope of the present invention as defined in the appended claims. For example, different event types may be used, and the present invention may be practiced in a non-object-oriented environment.

What is claimed is:

1. In a call center having agents stationed at agent stations that include computer systems and a telephony server for generating events regarding calling activity within the call center, a method practiced on a selected one of the computer systems of a given one of the agent stations, comprising the computer-implemented steps of providing an application program interface(API) that interfaces with the telephony server;

providing at least one application program that runs on the selected computer system;

selectively providing an event from the telephony server to the API if the event pertains to the given agent station; and passing the event to the application program from the API.

2. The method of claim 1, further comprising the step of registering the API with the telephony server to receive events from the telephony server.

3. The method of claim 2 wherein the API registers to receive events from the telephony server that concern calls destined to the given agent station.

4. The method of claim 3 wherein the API registers to receive all events that are generated from the telephony server that concern calls destined to be given agent station.

5. The method of claim 1 wherein the method further comprises the step of the application program registering with the API to receive certain events from the API.

6. The method of claim 5 wherein the application program registers to receive a subset of less than all of the events that are received by the API.

7. The method of claim 1 wherein multiple application programs are run on the selected computer system and wherein the event is passed to multiple ones of the application programs run on the selected computer system.

8. The method of claim 1 wherein the application program polls the API to determine if the API has any events to pass to the application program.

9. The method of claim 1 wherein the given agent station includes a telephone pad and wherein the application program controls the telephone pad.

10. The method of claim 1 wherein the application program is a sales and service program that performs sales and servicing processing.

11. In a call center having agents stationed at agent stations that include computer systems and a telephony server for generating events regarding calling activity within the call center, a method practiced on a selected one of the computer systems of a given one of the agent stations, comprising the computer-implemented steps of:

provoding a first application program and a second application program on the selected computer system;

providing an application program interface (API) on the selected computer system that interfaces with the telephony server to selectively receive events that pertain to the given agent station;

receiving a first event from the telephony server at the API;

passing the first event from the API to the first application program;

receiving a second event from the telephony server at the API; and passing the second event from the API to the second application program.

12. The method of claim 11 wherein the first application program registers to receive the first event and the second application program registers to receive the second agent.

13. The method of claim 11 wherein the first event is not passed to the second application program.

14. The method of claim 11, further comprising the step of registering the API with the telephony server to receive events from the telephony server.

15. The method of claim 14 wherein the API registers to receive events from the telephony server that concern calls destined to the given agent station.

16. The method of claim 15 wherein the API registers to receive all events that are generated from the telephony server that concern calls destined to the given agent station.

17. A call center comprising;

a telephony server for generating events regarding call activity in the call center;

an agent station for an agent to handle calls having a telephone pad and a computer system, said computer system including:

(i) an application program; and (ii) an application program interface (API) for interfacing with the telephony server to selectively receive events pertaining to the agent station from the telephony server and to pass the events to the application program.

18. The call center of claim 17, further comprising an additional agent station having an additional computer system that includes an additional instance of the API.

19. The call center of claim 17 wherein the computer includes an additional application program to which the API passes events received from the telephony server.

20. In a call center having a telephony server for generating events regarding calling activity in the call center, a computer system comprising:

a processor for running at least one application program and an application program interface that receives events from the telephony server and selectively forwards at least one of the events to the application program if the event is of a type requested by the application program; and a storage for storing the application program and the API.

21. The computer system of claim 20, further comprising an additional application program for receiving at least one event from the API.

22. The computer system of claim 20 wherein the application program controls the telephone pad.

23. In a call center having agents for handling calls, an agent computer system for running an application program and an application program interface (API) that interfaces with telephony servers and a telephony server for generating events regarding calling activity in the call center, a computer-readable medium holding computer-executable instructions for performing a method comprising the steps of:

passing an event from the telephony server to the API only if the event is of concern to the application program;

passing the event from the API to the application program.

24. The computer-readable medium of claim 23 wherein the API registers with telephony server to receive events.

25. The computer-readable medium of claim 23 wherein the application program registers with the API to receive events from the API.

26. The computer-readable medium of claim 23 wherein the agent computer system runs multiple application programs and wherein the API passes events from the telephony server to the multiple application programs.

* * * * *